United States Patent
Subat et al.

(10) Patent No.: US 12,122,279 B2
(45) Date of Patent: *Oct. 22, 2024

(54) VEHICLE HEADREST

(71) Applicant: Bose Corporation, Framingham, MA (US)

(72) Inventors: Bradford Kyle Subat, Northborough, MA (US); Charles Terence Henry Oswald, Salem, NY (US); Nicholas K. Lade, Waltham, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,639

(22) Filed: Jun. 27, 2023

(65) Prior Publication Data

US 2023/0339377 A1    Oct. 26, 2023

Related U.S. Application Data

(63) Continuation of application No. 17/682,458, filed on Feb. 28, 2022, now Pat. No. 11,724,629, which is a
(Continued)

(51) Int. Cl.
*H04R 1/02* (2006.01)
*B60N 2/01* (2006.01)
(Continued)

(52) U.S. Cl.
CPC ............. *B60N 2/879* (2018.02); *B60N 2/01* (2013.01); *H04R 1/025* (2013.01); *H04R 5/023* (2013.01);
(Continued)

(58) Field of Classification Search
CPC ........ H04R 1/025; H04R 5/023; H04R 1/023; H04R 1/26; H04R 1/345; H04R 2499/13
See application file for complete search history.

(56) References Cited

U.S. PATENT DOCUMENTS

| | | | |
|---|---|---|---|
| 4,638,884 A | 1/1987 | Lee | H04R 5/023 |
| | | | 181/141 |
| 5,133,017 A * | 7/1992 | Cain | G10K 11/17881 |
| | | | 381/71.4 |

(Continued)

FOREIGN PATENT DOCUMENTS

| | | |
|---|---|---|
| GB | 2522055 A | 7/2015 |
| JP | 04325338 | 11/1992 |

(Continued)

OTHER PUBLICATIONS

International Search Report and Written Opinion for International Application No. PCT/US2018/055529, dated Jan. 2, 2019, 16 pages.

*Primary Examiner* — Sunita Joshi
(74) *Attorney, Agent, or Firm* — Hoffman Warnick LLC

(57) ABSTRACT

Various implementations include vehicle headrest configurations and related audio systems. In some cases, a headrest includes: a main body having a front surface to support a back of a user's head and a pair of acoustic channels each formed in part by a side wall having a front edge that is offset from the front surface, the main body having a portion configured to receive first and second transducers, where a transducer mount in each of the pair of acoustic channels for mounting respective ones of the first and second transducers, where a dimension (Dimension C) is defined by a rotation angle of the transducer mount relative to a centerline of the vehicle headrest, wherein Dimension C is approximately −20 degrees to approximately zero degrees.

20 Claims, 8 Drawing Sheets

Related U.S. Application Data continuation of application No. 16/876,769, filed on May 18, 2020, now Pat. No. 11,285,851, which is a continuation of application No. 16/151,717, filed on Oct. 4, 2018, now Pat. No. 10,730,423.

(60) Provisional application No. 62/572,753, filed on Oct. 16, 2017.

(51) Int. Cl.
  *B60N 2/879* (2018.01)
  *H04R 1/26* (2006.01)
  *H04R 1/34* (2006.01)
  *H04R 5/02* (2006.01)

(52) U.S. Cl.
  CPC ............... *H04R 1/023* (2013.01); *H04R 1/26* (2013.01); *H04R 1/345* (2013.01); *H04R 2499/13* (2013.01)

(56) References Cited

U.S. PATENT DOCUMENTS

| | | |
|---|---|---|
| 9,049,534 B2 | 6/2015 | Eichfeld et al. |
| 9,699,537 B2 | 7/2017 | Oswald et al. |
| 2008/0130922 A1 | 6/2008 | Shibata et al. |
| 2010/0148550 A1 | 6/2010 | Kidd ................ B60N 2/879 |
| | | 297/217.4 |
| 2015/0201260 A1* | 7/2015 | Oswald ............. B60N 2/809 |
| | | 381/86 |

FOREIGN PATENT DOCUMENTS

| | | |
|---|---|---|
| JP | H05262184 A | 10/1993 |
| JP | 2016043828 A | 4/2016 |
| WO | 2016129663 A1 | 8/2016 |

\* cited by examiner

VEHICLE HEADREST

PRIORITY CLAIM

This application claims priority to pending U.S. patent application Ser. No. 17/682,458, filed Feb. 28, 2022, which itself claims priority to U.S. patent application Ser. No. 16/876,769, filed on May 18, 2020 (now U.S. Pat. No. 11,285,851), which itself claims priority to U.S. patent application Ser. No. 16/151,717, filed on Oct. 4, 2018 (now U.S. Pat. No. 10,730,423), which itself claims priority to U.S. Provisional Application No. 62/572,753, filed on Oct. 16, 2017, each of which is incorporated by reference in its entirety.

TECHNICAL FIELD

This disclosure generally relates to vehicle audio systems. More particularly, the disclosure relates to headrests in vehicle audio systems.

BACKGROUND

Conventional vehicle headrest configurations do not address the trade-offs between desired seat inter-aural parameters and undesired-seat interference. Some conventional systems attempt to balance these parameters using large headrests, where the front surface of the headrest serves as an acoustic radiator. However, the radiation patterns caused by this configuration can degrade inter-aural performance.

SUMMARY

All examples and features mentioned below can be combined in any technically possible way.

Various implementations include headrests and related vehicle audio systems. In certain implementations, a headrest is sized and configured to provide a balance between inter-aural parameter stability and inter-seat isolation.

Some particular implementations include a vehicle headrest having: a main body having a front surface arranged to support a back of a head of a user and a pair of acoustic channels each formed in part by a side wall having a front edge that is offset from the front surface, the main body comprising a portion configured to receive first and second transducers having a center-to-center spacing of approximately 130 millimeters (mm) to approximately 240 mm, where a dimension (Dimension K) defined by a distance between respective inside surfaces of the side walls of the pair of acoustic channels is related to a dimension (Dimension F) defined by an amount that the front edge of each side wall is recessed from the front surface.

Additional particular implementations include an audio system for a vehicle, the audio system having: a headrest coupled with a base of a seat in the vehicle, the headrest including: a main body having a front surface arranged to support a back of a head of a user and a pair of acoustic channels each formed in part by a side wall having a front edge that is offset from the front surface, where a dimension (Dimension K) defined by a distance between respective inside surfaces of the side walls of the pair of acoustic channels is related to a dimension (Dimension F) defined by an amount that the front edge of each side wall is recessed from the front surface; and a first transducer and a second transducer each housed within the main body of the headrest, the first and second transducers having a center-to-center spacing of approximately 130 millimeters (mm) to approximately 240 mm.

Further particular aspects include a headrest having: a main body having a front surface to support a back of a user's head and a pair of acoustic channels each formed in part by a side wall having a front edge that is offset from the front surface, the main body having a portion configured to receive first and second transducers having a center-to-center spacing of approximately 130 millimeters (mm) to approximately 240 mm, where a dimension (Dimension K) is defined by a distance between respective inside surfaces of side walls of the pair of acoustic channels, a dimension (Dimension F) is defined by an amount that the front edge of each side wall is recessed from the front surface and, the first and second transducers are oriented at an outward firing angle relative to the centerline of the vehicle headrest.

Additional particular aspects include a vehicle headrest having: a main body having a front surface arranged to support a back of a head of a user and a pair of acoustic channels each formed in part by a side wall having a front edge that is offset from the front surface, the main body including a portion configured to receive first and second transducers having a center-to-center spacing of approximately 130 millimeters (mm) to approximately 240 mm; and a transducer mount in each of the pair of acoustic channels for mounting respective ones of the first and second transducers, wherein a dimension (Dimension C) is defined by a rotation angle of the transducer mount relative to a centerline of the vehicle headrest such that when mounted to the respective transducer mounts, the first and second transducers are oriented at an outward firing angle relative to the centerline of the vehicle headrest, where a dimension (Dimension K) is defined by a distance between respective inside surfaces of the side walls of the pair of acoustic channels, a dimension (Dimension F) is defined by an amount that the front edge of each side wall is recessed from the front surface, and a width between exits of the pair of acoustic channels is defined by a dimension (Dimension E) that is equal to or greater than approximately 180 mm.

Further particular implementations include an audio system for a vehicle, the audio system having: a headrest coupled with a base of a seat in the vehicle, the headrest including: a main body having a front surface arranged to support a back of a head of a user and a pair of acoustic channels each formed in part by a side wall having a front edge that is offset from the front surface, where a dimension (Dimension K) is defined by a distance between respective inside surfaces of the side walls of the pair of acoustic channels, a dimension (Dimension F) is defined by an amount that the front edge of each side wall is recessed from the front surface, and a width between exits of the pair of acoustic channels is defined by a dimension (Dimension E) that is equal to or greater than approximately 180 mm; a transducer mount in each of the pair of acoustic channels; and a first transducer and a second transducer each housed within the main body of the headrest and each mounted to one of the transducer mounts, the first and second transducers having a center-to-center spacing of approximately 130 millimeters (mm) to approximately 240 mm, where a dimension (Dimension C) is defined by a rotation angle of the transducer mount relative to a centerline of the vehicle headrest such that the first and second transducers are oriented at an outward firing angle relative to the centerline of the vehicle headrest.

Additional particular aspects include a main body having a front surface arranged to support a back of a head of a user and a pair of acoustic channels each formed in part by a side wall having a front edge that is offset from the front surface, the main body having a portion configured to receive first and second transducers having a center-to-center spacing (Dimension A) of approximately 130 millimeters (mm) or greater; and a transducer mount in each of the pair of acoustic channels for mounting respective ones of the first and second transducers, wherein a dimension (Dimension C) is defined by a rotation angle of the transducer mount relative to a centerline of the vehicle headrest, wherein Dimension C is approximately −20 degrees to approximately zero degrees, such that when mounted to the respective transducer mounts, the first and second transducers are oriented at a forward firing angle or an inward firing angle relative to the centerline of the vehicle headrest, wherein a dimension (Dimension F) is defined by an amount that the front edge of each side wall is recessed from the front surface and is equal to or less than approximately 35 mm.

In further particular aspects, an audio system for a vehicle includes: a headrest coupled with a base of a seat in a vehicle, the headrest having: a main body having a front surface arranged to support a back of a head of a user and a pair of acoustic channels each formed in part by a side wall having a front edge that is offset from the front surface; a transducer mount in each of the pair of acoustic channels; a first transducer and a second transducer each housed within the main body of the headrest and each mounted to one of the transducer mounts, wherein a dimension (Dimension C) is defined by a rotation angle of the transducer mount relative to a centerline of the vehicle headrest, wherein Dimension C is approximately −20 degrees to approximately zero degrees, such that the first and second transducers are oriented at a forward firing angle or an inward firing angle relative to the centerline of the vehicle headrest, wherein a dimension (Dimension F) is defined by an amount that the front edge of each side wall is recessed from the front surface and is equal to or less than approximately 35 mm.

Additional particular aspects include a vehicle headrest having: a main body having a front surface arranged to support a back of a head of a user and a pair of acoustic channels each formed in part by a side wall having a front edge that is offset from the front surface, the main body comprising a portion configured to receive first and second transducers having a center-to-center spacing (Dimension A) of approximately 130 millimeters (mm) or greater, where the pair of acoustic channels are arranged symmetrically about a centerline axis of the main body; and a transducer mount in each of the pair of acoustic channels for mounting respective ones of the first and second transducers, wherein a dimension (Dimension C) is defined by a rotation angle of the transducer mount relative to a centerline of the vehicle headrest, wherein Dimension C is approximately −20 degrees to approximately zero degrees, such that when mounted to the respective transducer mounts, the first and second transducers are oriented at a forward firing angle or an inward firing angle relative to the centerline of the vehicle headrest.

Further particular aspects include an audio system for a vehicle, the audio system having: a headrest coupled with a base of a seat in a vehicle, the headrest including: a main body having a front surface arranged to support a back of a head of a user and a pair of acoustic channels each formed in part by a side wall having a front edge that is offset from the front surface, wherein the main body comprises a material that is acoustically non-transparent; a transducer mount in each of the pair of acoustic channels; and a first transducer and a second transducer each housed within the main body of the headrest and each mounted to one of the transducer mounts, wherein a dimension (Dimension C) is defined by a rotation angle of the transducer mount relative to a centerline of the vehicle headrest, wherein Dimension C is approximately −20 degrees to approximately zero degrees, such that the first and second transducers are oriented at a forward firing angle or an inward firing angle relative to the centerline of the vehicle headrest.

Further particular aspects include a vehicle headrest having: a main body having a front surface arranged to support a back of a head of a user and a pair of acoustic channels each formed in part by a side wall having a front edge that is offset from the front surface, the main body comprising a portion configured to receive first and second transducers having a center-to-center spacing (Dimension A) of approximately 130 millimeters (mm) or greater; and a transducer mount in each of the pair of acoustic channels for mounting respective ones of the first and second transducers, wherein a dimension (Dimension C) is defined by a rotation angle of the transducer mount relative to a centerline of the vehicle headrest, wherein Dimension C is approximately −20 degrees to approximately zero degrees, such that when mounted to the respective transducer mounts, the first and second transducers are oriented at a forward firing angle or an inward firing angle relative to the centerline of the vehicle headrest, wherein a width between exits of the pair of acoustic channels is defined by a dimension (Dimension E) that is at least approximately 180 mm.

Implementations may include one of the following features, or any combination thereof.

In certain cases, Dimension F is equal to approximately 5-55 mm.

In particular aspects, Dimensions F and K are further related to a dimension (Dimension E) defined by a width between exits of the pair of acoustic channels. In some implementations, Dimension E is equal to or greater than approximately 180 mm.

In certain cases, respective radiation patterns of the first and second transducers are each defined by respective shapes and dimensions of respective ones of the pair of acoustic channels.

In various implementations, the vehicle headrest further includes a transducer mount in each of the pair of acoustic channels for mounting respective ones of the first and second transducers, where a dimension (Dimension C) is defined by a rotation angle of the transducer mount relative to a centerline of the vehicle headrest. In some aspects, Dimension C is equal to approximately −20 degrees to approximately +40 degrees.

In various cases, the vehicle headrest further includes first and second transducers located in a respective one of the pair of acoustic channels. In certain implementations, the vehicle headrest further includes third and fourth transducers located in a respective one of the pair of acoustic channels and having a center-to-center spacing of approximately 130 millimeters (mm) to approximately 240 mm. In some aspects, the vehicle headrest further includes respective acoustic seals around each of the first and second transducers for impeding acoustic energy leakage from the first and second transducers into the main body. In various implementations, a dimension (Dimension D) is defined by a distance from the front surface of the main body to a midpoint of each of the transducers. In particular cases, Dimension D is equal to approximately 15-60 mm.

In certain aspects, the main body portion is further configured to receive the first and second transducers having a center-to-center spacing of approximately 170 mm to approximately 220 mm.

In various implementations, the main body includes a material that is acoustically non-transparent.

In some cases, the pair of acoustic channels are arranged symmetrically about a centerline axis of the main body.

In particular aspects, a perpendicular line (Dimension J) drawn from a face of each of the respective first and second transducers is acoustically unobstructed by the respective acoustic channels. In certain implementations, the vehicle further includes a plurality of rows of seats, and where the headrest is coupled with the base of a seat in a front row of the seats, a middle row of the seats or a back row of the seats. In some cases, the headrest is coupled with the base of the seat located in only the middle row of the seats or the back row of the seats.

In particular implementations, the seat is part of a row of seats, and each of the seats in the row includes an additional headrest that is substantially identical to the headrest.

In certain aspects, the audio system further includes third and fourth transducers located in a respective one of the pair of acoustic channels and having a center-to-center spacing of approximately 130 millimeters (mm) to approximately 240 mm.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

Figure 1:
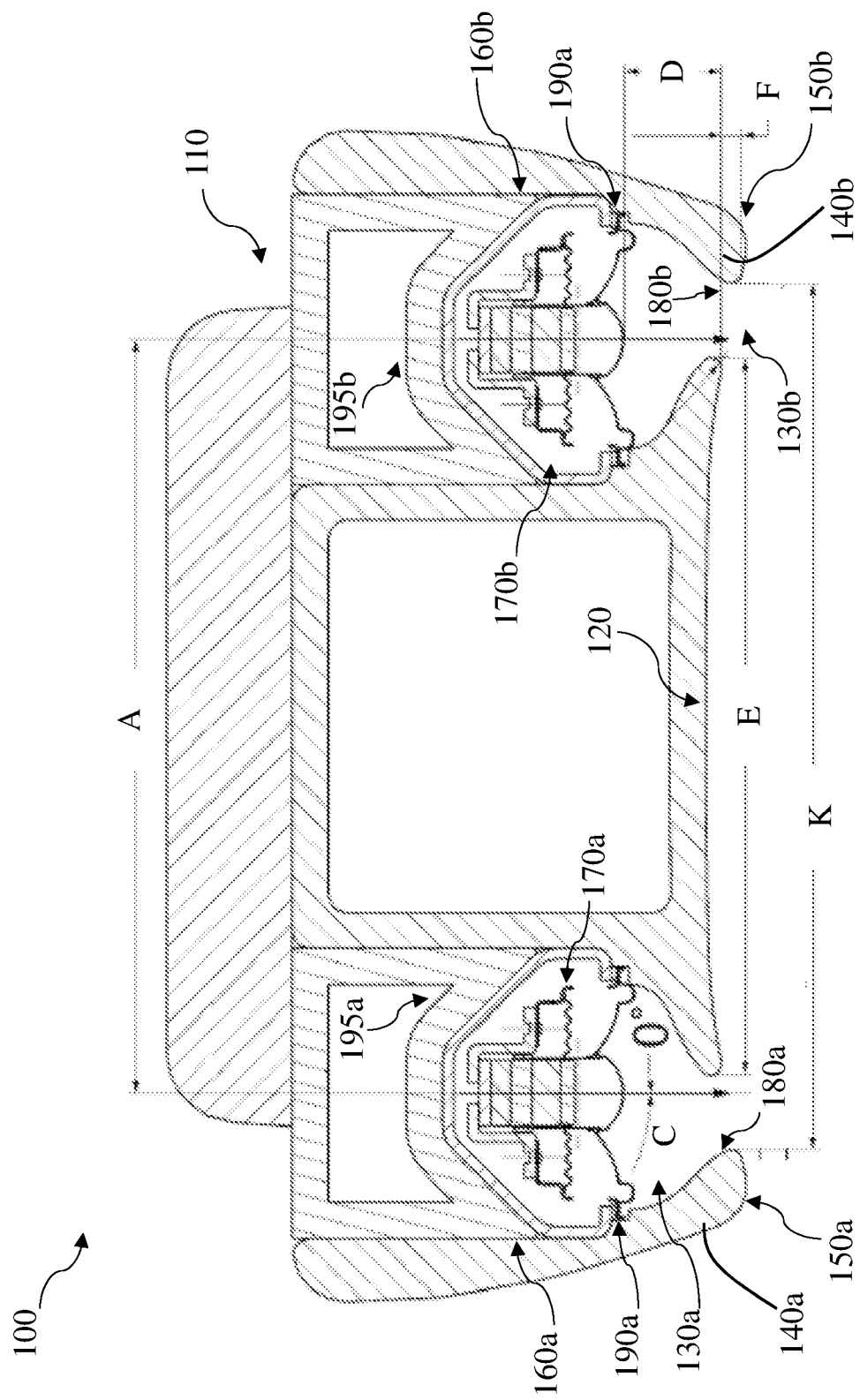
FIG. 1 is a top cross-sectional depiction of a headrest according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a vehicle headrest can be sized and configured to provide a balance between inter-aural parameter stability and inter-seat isolation, and that such a headrest can be beneficially incorporated into a vehicle audio system. The headrest and related system can significantly improve the user experience when compared with conventional vehicle audio systems.

Commonly labeled components in the FIGURES are considered to be substantially equivalent components for the purposes of illustration, and redundant discussion of those components is omitted for clarity.

Though the elements of several views of the drawing may be shown and described as discrete elements in a block diagram and may be referred to as "circuitry", unless otherwise indicated, the elements may be implemented as one of, or a combination of, analog circuitry, digital circuitry, or one or more microprocessors executing software instructions. The software instructions may include digital signal processing (DSP) instructions. Operations may be performed by analog circuitry or by a microprocessor executing software that performs the mathematical or logical equivalent to the analog operation. Unless otherwise indicated, signal lines may be implemented as discrete analog or digital signal lines, as a single discrete digital signal line with appropriate signal processing to process separate streams of audio signals, or as elements of a wireless communication system. Some of the processes may be described in block diagrams. The activities that are performed in each block may be performed by one element or by a plurality of elements, and may be separated in time. The elements that perform the activities of a block may be physically separated. Unless otherwise indicated, audio signals or video signals or both may be encoded and transmitted in either digital or analog form; conventional digital-to-analog or analog-to-digital converters may not be shown in the figures.

According to various implementations, a headrest is provided with integrated acoustic transducers to deliver audio to the occupant of the seat. A minimum of two acoustic transducers, the transducer back-side enclosures, and acoustic channels are part of the acoustic integration into a headrest described according to some implementations. An acoustic channel is defined herein as the exit from a transducer radiating surface out of the headrest and into the vehicle cabin. The acoustic channel shape, driver positioning and firing angle, and the exit point on the headrest surface are all characteristics that determine the radiation pattern of the acoustic transducer into the vehicle cabin.

Certain conventional headrests, including the design described in U.S. Pat. No. 9,699,537, specify transducer placement and acoustic channel characteristics to achieve beneficial inter-aural characteristics in the desired seat with a small form-factor headrest. However, different trade-offs can be chosen when designing a headrest for both the desired occupant inter-aural parameters while reducing interference to other nearby seats in the vehicle. The desired-seat inter-aural and undesired-seat(s) interference characteristics of a design are opposing design goals. Wider headrests, as seen in some vehicles, afford a range of designs that can achieve both goals by utilizing the front surface of the headrest for acoustic radiation (proximate the channel outlets). Some acoustic headrest designs with radiation from the front surface exist in conventional systems, but they do so while sacrificing inter-aural characteristics due to their radiation patterns.

As discussed with reference to various implementations, the positioning of the acoustic opening on the headrest surface plays an important role in the balance of the two major design goals of inter-aural characteristics and interference to other seats. Various implementations include vehicle headrests with a prescribed minimum and maximum width between the left and right side acoustic channel exits, side wall positioning, transducer positioning, and transducer angle. These characteristics help to define the acoustic channel and its exit into the vehicle, and thereby, determine a balance between inter-aural parameter stability and inter-seat isolation.

While inter-seat isolation is important, inter-aural parameter (inter-aural level difference and inter-aural phase difference) stability can be especially significant to maintaining binaural control from the near-field transducers mounted in an acoustic headrest. Maintaining consistent inter-aural level and phase while the listener is free to move within a normal seating position allows continual binaural control. This binaural control enables features that can leverage these inter-aural parameters for acoustic image rendering on, and beyond, the headrest. That is, headrests according to various implementations are designed to provide enhanced inter-seat isolation when compared with conventional designs, while also limiting compromise to the inter-aural parameter stability with near-field transducers.

In order to reduce acoustic energy leakage to other seats in the vehicle cabin relative to the near-listener, there are two main aspects of the acoustic channel exit formation. First, the direct path of energy to the desired listener is increased by having an exit nearest their ear; namely the front face of the headrest. The second is to use a side wall as shown in the top cross-sectional depiction of a headrest 100 in FIG. 1. In this depiction, the headrest 100 includes a main body 110 having a front face (or surface) 120 and a pair of acoustic channels 130a,b formed in part by a side wall 140a,b. The side walls 140a,b can have a front edge 150a,b that extends beyond the front surface 120 (that is, forward of the front surface 120 relative to the user's head position). The main body 110 can include portions 160a,b configured to receive first and second transducers 170a,b, respectively. In various implementations, the first transducer 170a and second transducer 170b have a center-to-center spacing of approximately 130 millimeters (mm) to approximately 240 mm. Additionally shown is an acoustic seal 190a,b around each of the first and second transducers 170a,b for impeding acoustic energy leakage from the first and second transducers 170a,b into the main body 110.

The side walls 140a,b in this configuration protrude to keep the center of the acoustic exit of the channels 130a,b near the desired listener and to direct energy away from other occupants. The dimensions of FIG. 1 are such that favorable inter-seat isolation, defined as the ratio of energy received by the desired occupant to the energy received by other occupants, is achieved. However, the protruding side wall 140a,b in this case reduces the stability of inter-aural parameters, particularly when a user moves their head laterally. This inter-aural parameter instability renders the acoustic headrest 100 illustrated in FIG. 1 an undesirable fit for a headrest application.

Figure 2:
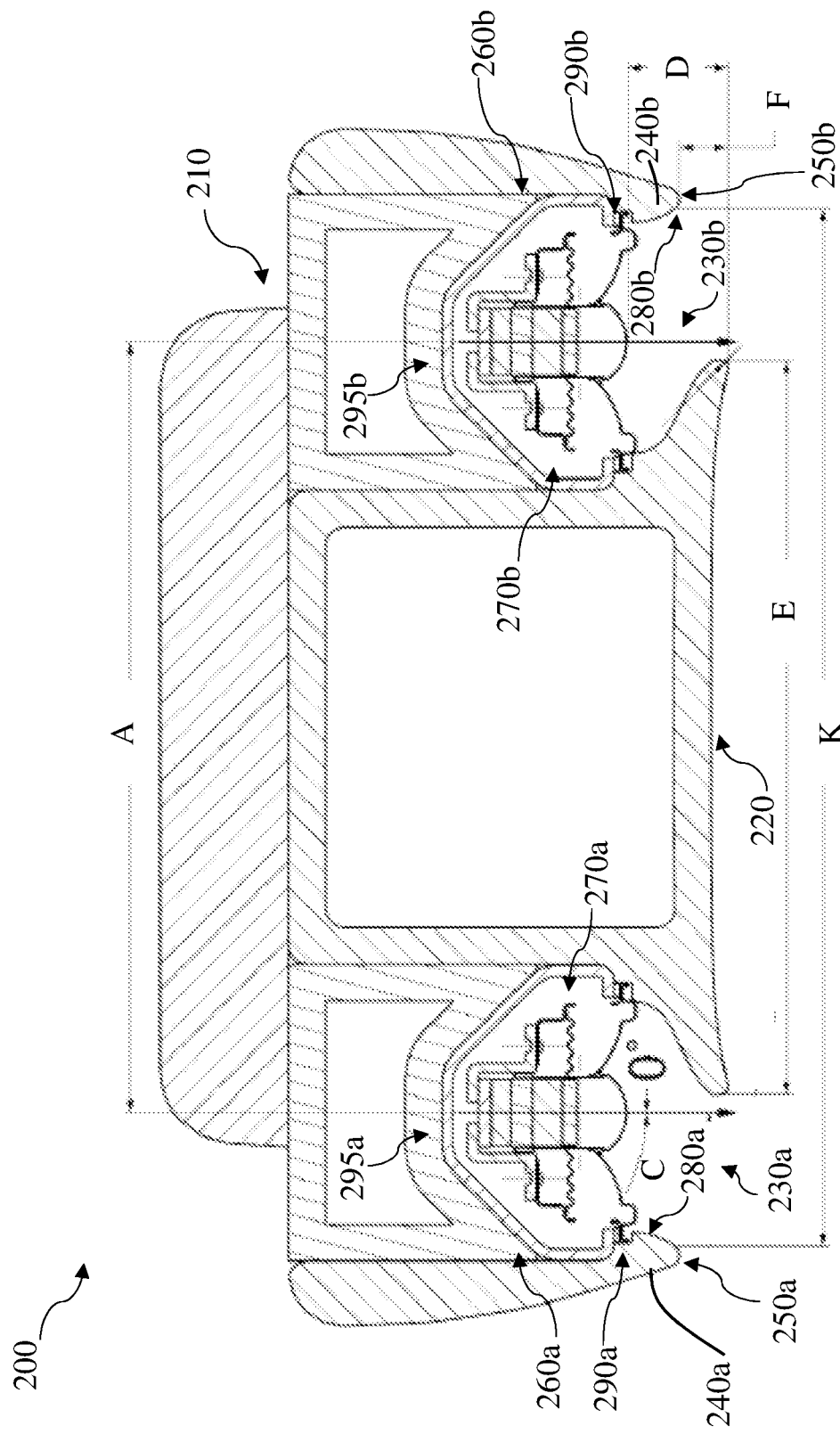
FIG. 2 is a top cross-sectional depiction of a headrest according to various additional implementations.

FIG. 2 depicts an additional headrest 200 according to various implementations. Headrest 200 can include a main body 210 having a front surface 220 and a pair of acoustic channels 230a,b formed in part by side walls 240a,b. The side walls 240a,b can have a front edge 250a,b that is offset from the front surface 220. In particular, the front edge 250a,b of side wall 240a,b is recessed from the front surface 220 of the main body 210. The main body 210 can include portions 260a,b configured to receive first and second transducers 270a,b, respectively. In various implementations, the first transducer 270a and second transducer 270b have a center-to-center spacing of approximately 130 millimeters (mm) to approximately 240 mm. In certain implementations, a dimension (Dimension K) defined by a distance between respective inside surfaces 280a,b of the side walls 240a,b is related to a dimension (Dimension F) defined by an amount that the front edge 250a,b of each side wall 240a,b is recessed from the front surface 220 of the main body 210.

The headrest 200 shown in FIG. 2 can address the inter-aural parameter instability concerns of the headrest 100 shown in FIG. 1 without compromising the balance between inter-seat isolation and inter-aural parameter stability. This balance of isolation to other seats in the vehicle and inter-aural parameter stability renders the acoustic headrest 200 a good fit for a headrest application. Dimension F shown in FIG. 2 illustrates a distinction between headrest 100 (FIG. 2) and headrest 200, in particular, the recessed side walls 240a,b of the acoustic channels 230a,b. While Dimension F in headrest 100 has a negative value (indicating not being recessed), Dimension F in headrest 200 can be equal to approximately 5 mm to approximately 55 mm.

Figure 3:
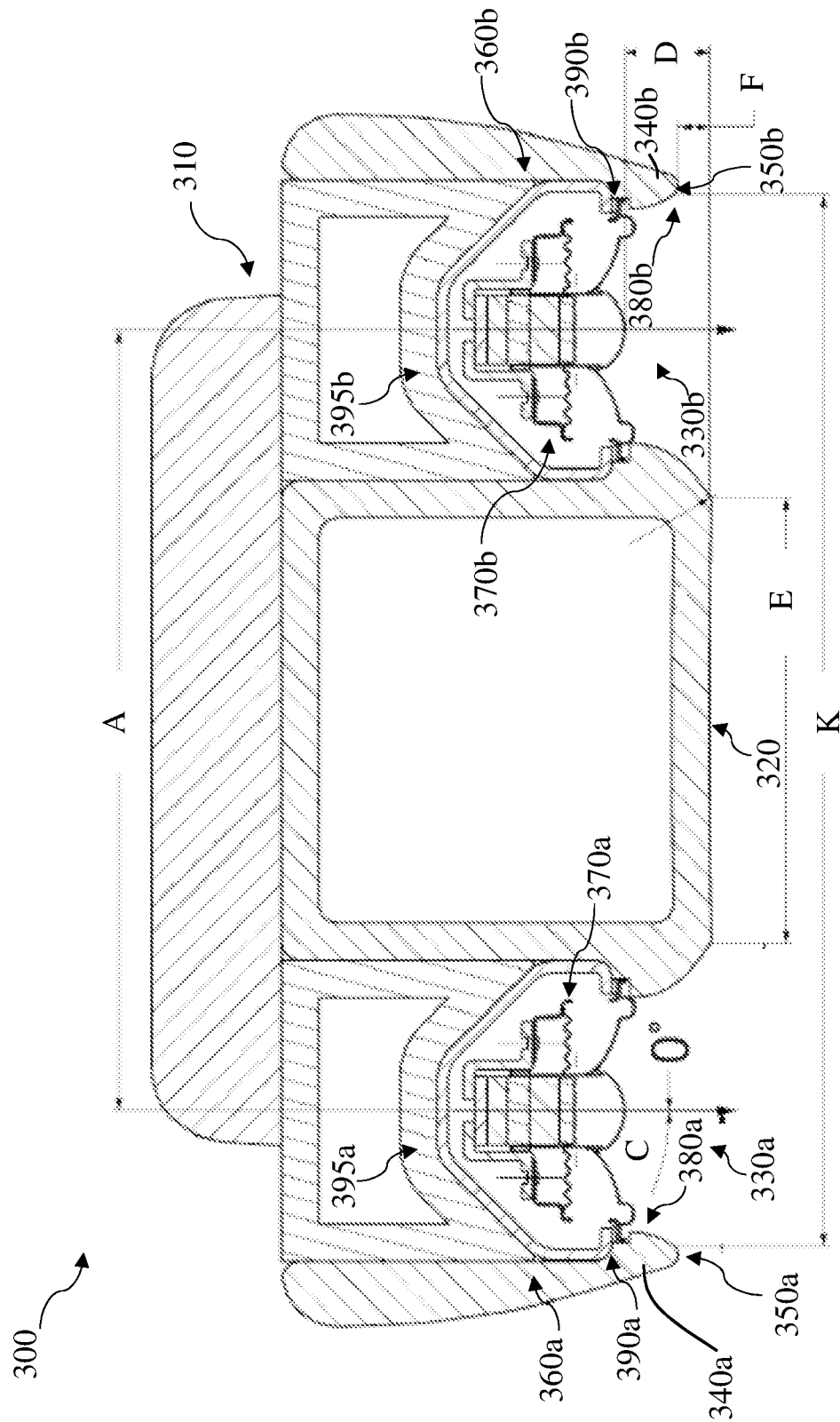
FIG. 3 is a top cross-sectional depiction of a headrest according to certain implementations.

FIG. 3 illustrates a headrest 300 that is similar to headrest 200 (FIG. 2), with a body 310 having a front surface 320. In contrast to the front surface 220 of headrest 200, front surface 320 of headrest 300 has a reduced width (measured between acoustic channels 330a,b), in this case, reduced by approximately 30-40 percent (e.g., from approximately 200 mm (headrest 200, FIG. 2) to approximately 120 mm (headrest 300, FIG. 3)). This width is indicated as Dimension E in FIG. 3. While headrest 300 improves inter-seat isolation relative to headrest 200, it reduces inter-aural parameter stability to an unacceptable level. This inter-aural parameter instability renders the acoustic headrest 300 illustrated in FIG. 3 a poor fit for a headrest application.

Figure 4:
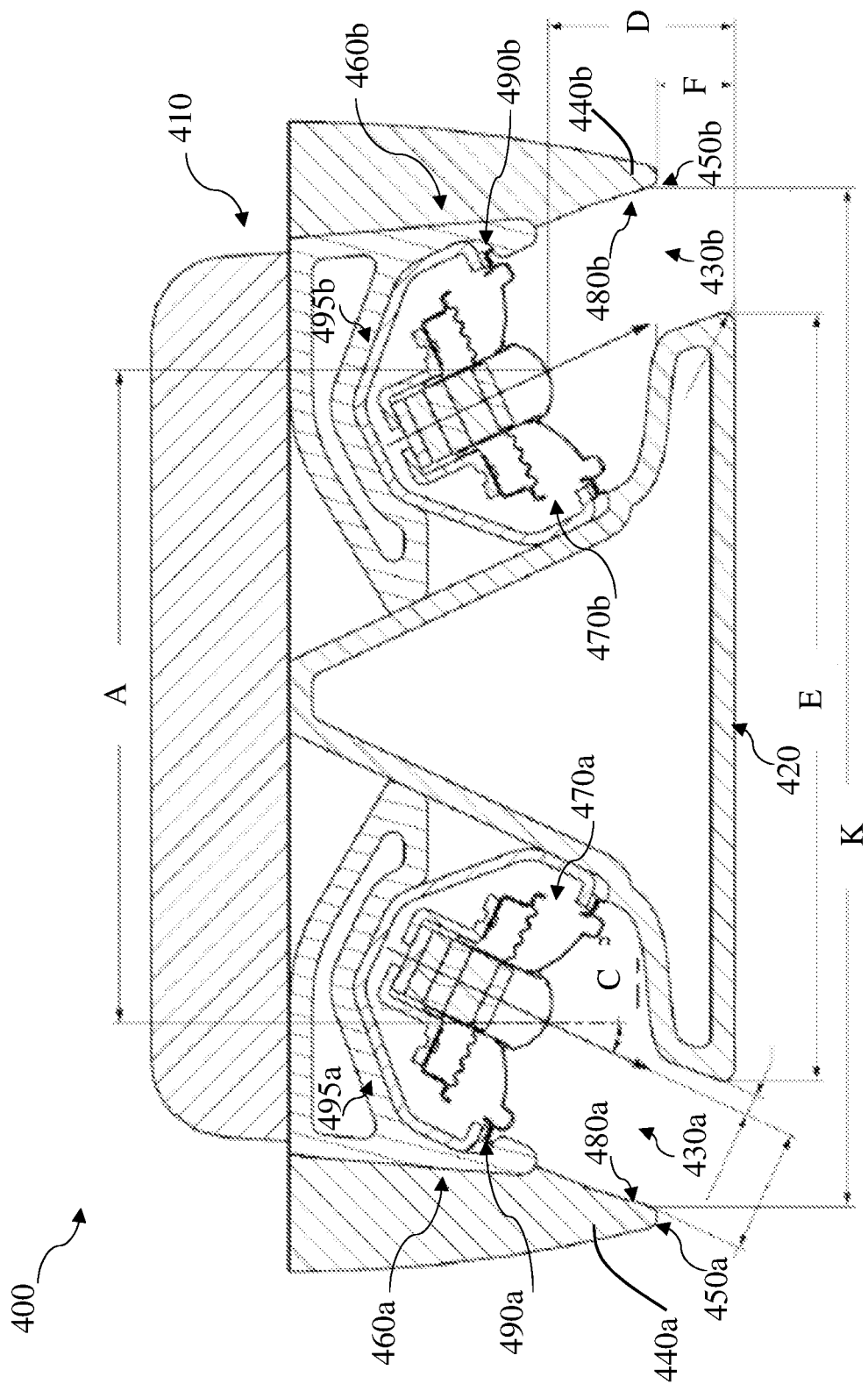
FIG. 4 is a top cross-sectional depiction of a headrest according to various additional implementations.

FIG. 4 shows an additional headrest 400 according to various implementations, including a body 410 having a front surface 420, and a pair of acoustic channels 430a,b formed in part by side walls 440a,b. The side walls 440a,b have a front edge 450a,b that is offset from the front surface 420. The main body 410 can include portions 460a,b configured to receive first and second transducers 470a,b, respectively. The configuration of headrest 400 enables a narrower headrest form envelope relative to the configurations shown in FIGS. 1-3. This narrower envelope is achieved by reducing the width between the transducers 470a,b (Dimension A), as well as dimension (Dimension K) defined by the distance between respective inside surfaces 480 of the side walls 440a,b when compared with headrests shown in FIGS. 1-3. In some cases, the width between transducers 470a,b in headrest 400 (Dimension A) is reduced by approximately 15-25 percent relative to the headrests shown in FIGS. 1-3 (e.g., from approximately 210 mm separation to approximately 170 mm). In these implementations, the width of the front surface 420 (Dimension E), along with the recessed side walls 440a,b (Dimension F) can provide for desired inter-seat isolation as well as inter-aural stability. While distinctly configured from headrest 200 (FIG. 2), headrest 400 (FIG. 4) can similarly provide desired inter-seat isolation as well as inter-aural stability. In contrast to headrest 200, headrest 400 includes transducers 470a,b that are oriented at an angle (rotation angle) relative to a centerline of the vehicle headrest 400. That is, the transducers 470a,b are coupled to respective mounts 495a,b that are angled relative to the centerline ($V_c$) of the vehicle headrest 400. This dimension (Dimension C) is illustrated in FIG. 4 for the mounts 480a,b. In particular implementations, the width of the exit of each channel 430a,b is between approximately 28 mm to approximately 48 mm (and in some examples, approximately 38 mm).

Transducers (e.g., transducers 270*a,b* or transducers 470*a,b*) are omni-directional at lower frequencies, but become directional perpendicular to the cone face at higher frequencies for which the wavelength becomes similar in proportion to the transducer diameter. For example, transducers (e.g., transducers 270*a,b* or transducers 470*a,b*) are highly directional above frequencies for which the transducer diameter is greater than $\lambda/2$, where $\lambda$ is the propagating sound wave length.

Figure 5:
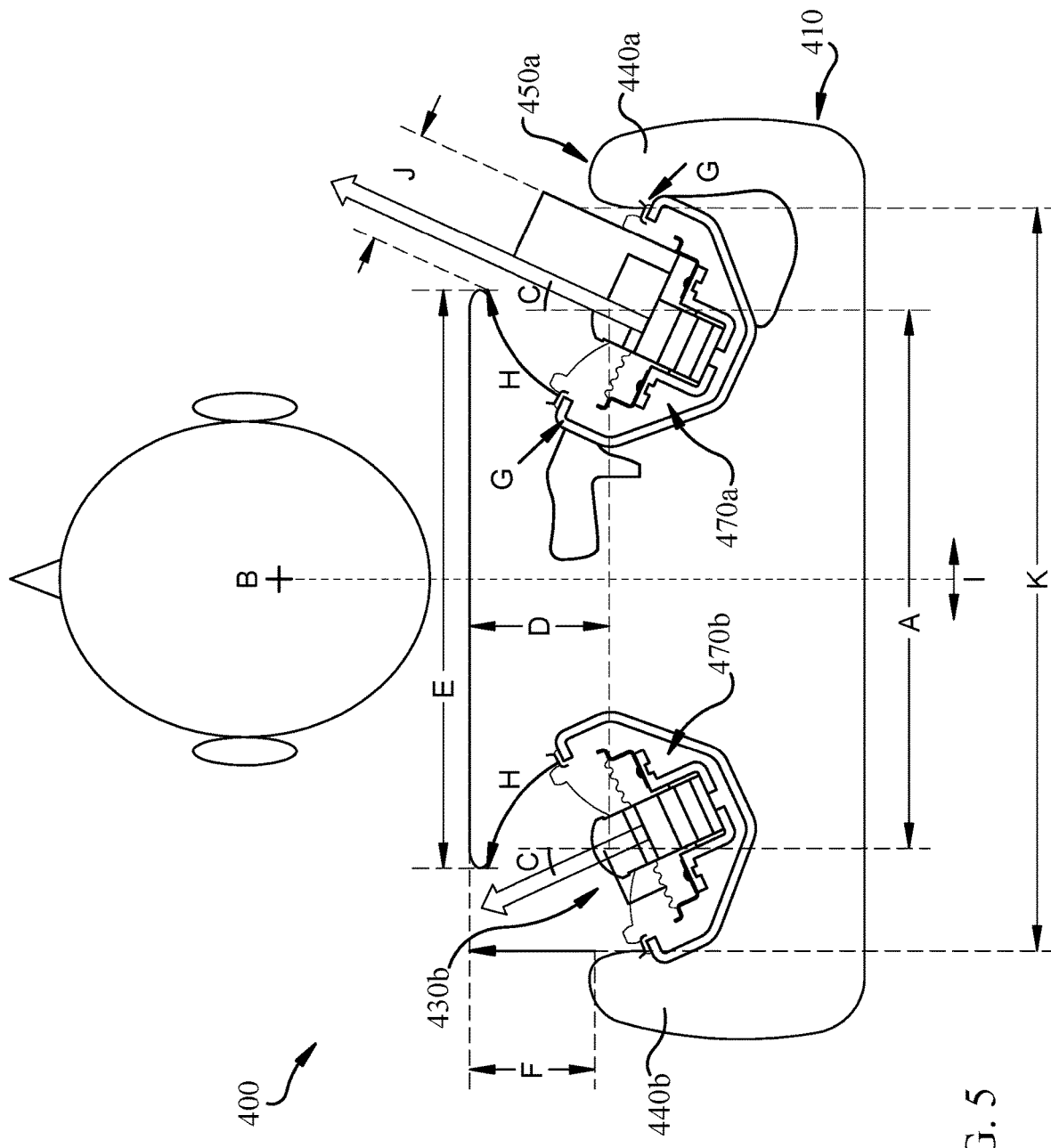
FIG. 5 is an acoustic horizontal cross-section of a representative headset according to various implementations, annotated with dimensional references.

FIG. 5 shows a top view of an acoustic horizontal cross-section of a representative headset according to various implementations. This depiction is annotated with references to headrest 400 as an example, for contextual purposes. This depiction is further annotated with dimensional references, some of which are described with ranges, trends and/or proportions, as well as some specific values as examples. These dimensional specifications enable good balance between inter-aural parameter stability and interseat isolation within a form factor of headrests configured to fit in passenger vehicles. These dimensional specifications also relate to the depictions of various headset implementations described herein, e.g., headset 200 (FIG. 2) and headset 400 (FIG. 4).

As shown, Dimension A is the center-to-center spacing of the transducers and in some example implementations, can fall in the range of approximately 130 mm to approximately 240 mm. This wide range allows transducer packaging in a variety of headrest form factors and accommodates smaller transducers, which may be more widely spaced within a fixed headrest envelope. Dimension B indicates the line of symmetry of the headrest and the occupant head are coincident. Dimension C, as described herein, indicates the outboard transducer rotation from center. This dimension can trend from approximately −20 degrees to approximately +40 degrees with larger transducer spacing, A, associated with lower rotation angles (Dimension C); and smaller transducer spacing, A, associated with larger rotation angles (Dimension C). Dimension D is the distance from the headrest front surface to the transducer midpoint, or dustcap. In some particular example implementations, this ranges from approximately 15 mm to approximately 60 mm to accommodate various headrest form factors. Dimension E shows the width between two acoustic channel exits across the front face of the headrest body. In some example implementations, Dimension E is greater than approximately 180 mm, and in particular examples, can range from approximately 180 mm to approximately 220 mm. According to certain implementations, Dimensions F and K are further related to Dimension E.

In various implementations, the headrest body is formed of an acoustically non-transparent material (e.g., a foam such as polyurethane (PU)) which separates the acoustic channels. That is, the material in the headrest body does not permit acoustic waves to pass entirely therethrough, preventing unwanted mixing of acoustic energy between the transducers.

Additionally shown in FIG. 5 is Dimension F (e.g., approximately 5 mm to approximately 55 mm), which as described herein, indicates the recess distance from the front edge of the sidewall to the front face of the headrest. Dimension K, as described herein, is the distance between the insides of the side walls at the acoustic exit. As Dimension K gets larger, Dimension F trends smaller and as Dimension K gets smaller, Dimension F may trend larger to achieve inter-seat isolation without degradation of inter-aural parameter stability. Feature G, as described herein, shows the acoustic seals around each of the transducers for impeding acoustic energy leakage from the first and second transducers into the main body. The seals can enhance acoustic energy transmission to the desired space out the acoustic channel, and prevent undesirable cross-coupling of left and right transducer outputs. Feature H indicates an example of a minimum radius applied to all corners on the front and sides of the headrest at the acoustic channel openings. Feature I represents an example configuration, whereby complete left/right symmetry in is maintained to facilitate placement of an acoustic headrest as described herein in either left or right seats of the vehicle. Unless otherwise noted, implementations described herein (e.g., in headrests shown and described in FIGS. 1-4, 6 and 7) can be configured with left/right symmetry such that the headrests can be placed in a vehicle audio system in either left or right seats of the vehicle.

Dimension J is a perpendicular line drawn from the transducer front face, and as shown in this configuration, is acoustically unobstructed when leaving the acoustic channel. That is, Dimension J, indicates that acoustically transparent objects, such as grilles intended for acoustic transmission, can be present in the acoustic channel between the front face of the transducer and the exit, but that other solid objects such as brackets or foam do not inhibit Dimension J. Unless otherwise noted, implementations described herein can be configured with acoustically unobstructed channels for transducers.

Figure 6:
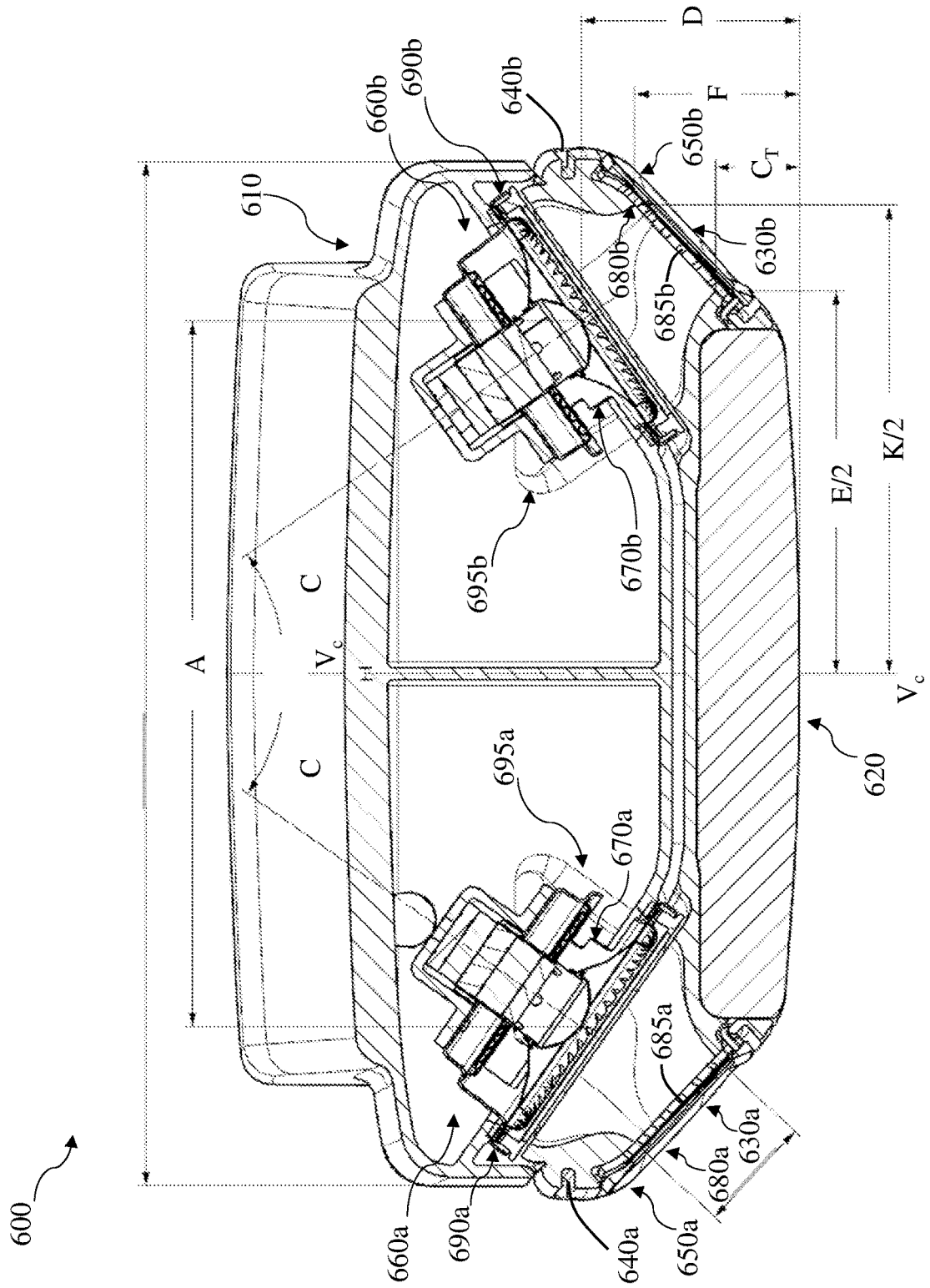
FIG. 6 is a top cross-sectional depiction of a headrest according to further implementations.

FIG. 6 illustrates an additional configuration of a headrest 600 according to various implementations. As shown, headrest 600 includes a body 610 having a front surface 620, and a pair of acoustic channels 630*a,b* formed in part by side walls 640*a,b*. The side walls 640*a,b* have a front edge 650*a,b* that is offset from the front surface 620. The main body 610 can include portions 660*a,b* configured to receive first and second transducers 670*a,b*, respectively. This configuration additionally shows an acoustically transparent cover 685*a,b* over the channels 630*a,b*, spanning between the inner surfaces 680*a,b* of sidewalls 640*a,b*. In some cases, the acoustically transparent cover 685*a,b* can include a netting, cloth or wire mesh grille.

Figure 7:
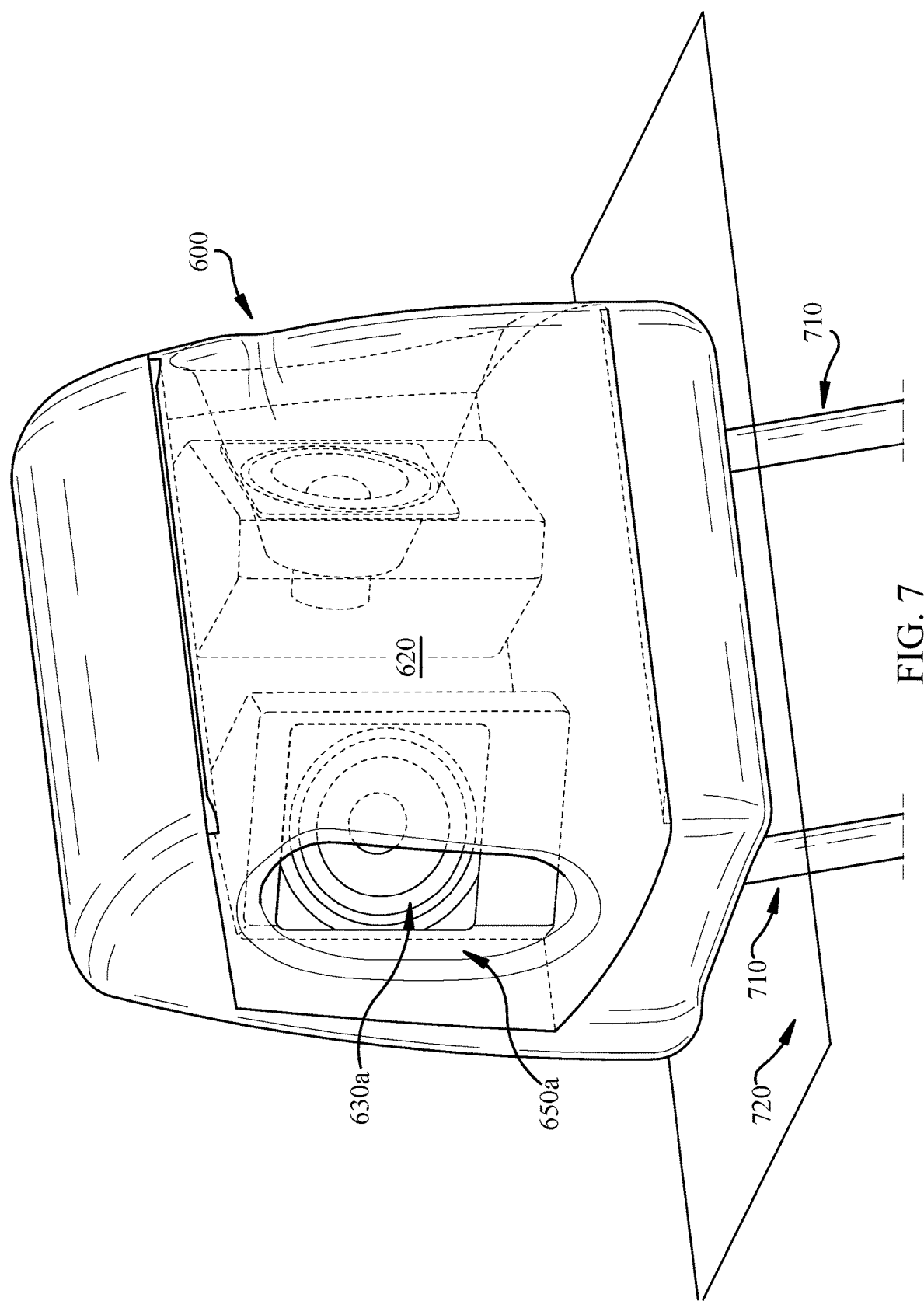
FIG. 7 is a perspective view of a headrest according to various implementations.

FIG. 7 shows the headrest 600 in perspective view, with the addition of mounts 710 for coupling with a seat base 720 (outlined in this view). With reference to FIGS. 6 and 7, the configuration of headrest 600 is such that the front edge 650*a,b* of the sidewalls is recessed from the front surface 620 of the main body 610, e.g., by as much as 35-45 mm (Dimension F). In some cases, the front surface 620 is arced or bowed outward toward the user, such that the front surface 620 bends back toward the acoustic channels 630*a,b* from its center point. As shown in FIGS. 6 and 7, the headrest 600 includes the transducers 670*a,b*, that have a positive outboard rotation from center (Dimension C). That is, in this implementation, the transducers 670*a,b* can have an even greater positive outboard rotation from center (Dimension C) than in the headrest 400, e.g., equal to or greater than approximately 35 degrees rotation for each transducer 670*a,b*.

Similar to headrest 400 (FIG. 4), the configuration of transducers in headrest 600 enables a narrower headrest form envelope relative to the configurations shown in FIGS. 1-3. This narrower envelope is achieved by reducing the width between the transducers 670*a,b*, as well as Dimension K between respective inside surfaces 680*a,b* of the side walls 640*a,b* when compared with headrests shown in FIGS. 1-3. In some cases, the width between transducers 670*a,b* in headrest 600 is reduced by approximately 15-25 percent relative to the headrests shown in FIGS. 1-3 (e.g., from approximately 210 mm separation to approximately 175 mm). In these implementations, the width of the front surface 620, along with the recessed side walls 640*a,b* can provide for desired inter-seat isolation as well as inter-aural stability. Additionally, relative to headrest 400 (FIG. 4), the headrest 600 can have narrower channel openings, e.g., where the width of the exit of each channel 630*a,b* is between approximately 26 mm to approximately 32 mm (and in some cases, approximately 29 mm). As noted with respect to the various implementations herein, respective radiation patterns of the first and second transducers 670*a,b* are defined by respective shapes and dimensions of respective ones of the pair of acoustic channels 630*a,b*.

While distinctly configured from headrest 200 (FIG. 2), and headrest 400 (FIG. 4), headrest 600 (FIG. 6) can similarly provide desired inter-seat isolation as well as inter-aural stability. In contrast to headrest 200, and similar to headrest 400, headrest 600 includes transducers 670*a,b* that are oriented at an angle (rotation angle) relative to a centerline of the vehicle headrest 600. That is, the transducers 670*a,b* are coupled to respective mounts 695*a,b* that are angled relative to the centerline (Vc) of the vehicle headrest 400.

Additionally shown in headrest 600 is a thickened front cushion 690 in the main body 610, which can have a thickness ($C_T$) of as much as 20-30 mm.

While various headrest implementations are described as having a pair of transducers (e.g., two transducers in headrests 200, 400 and 600 in FIGS. 2, 4, and 6), these implementations can additionally include another pair of transducers, one in each of the acoustic channels and located either above or below the first or second transducer in that acoustic channel. These additional transducers can be vertically aligned with the first and second transducers (e.g., each over transducers 270*a,b* in FIG. 2, or each under transducers 470*a,b* in FIG. 4) such that the third and fourth transducers have a center-to-center spacing that is approximately equal to the center-to-center spacing between the first and second transducers (e.g., approximately 130 millimeters (mm) to approximately 240 mm).

Figure 8:
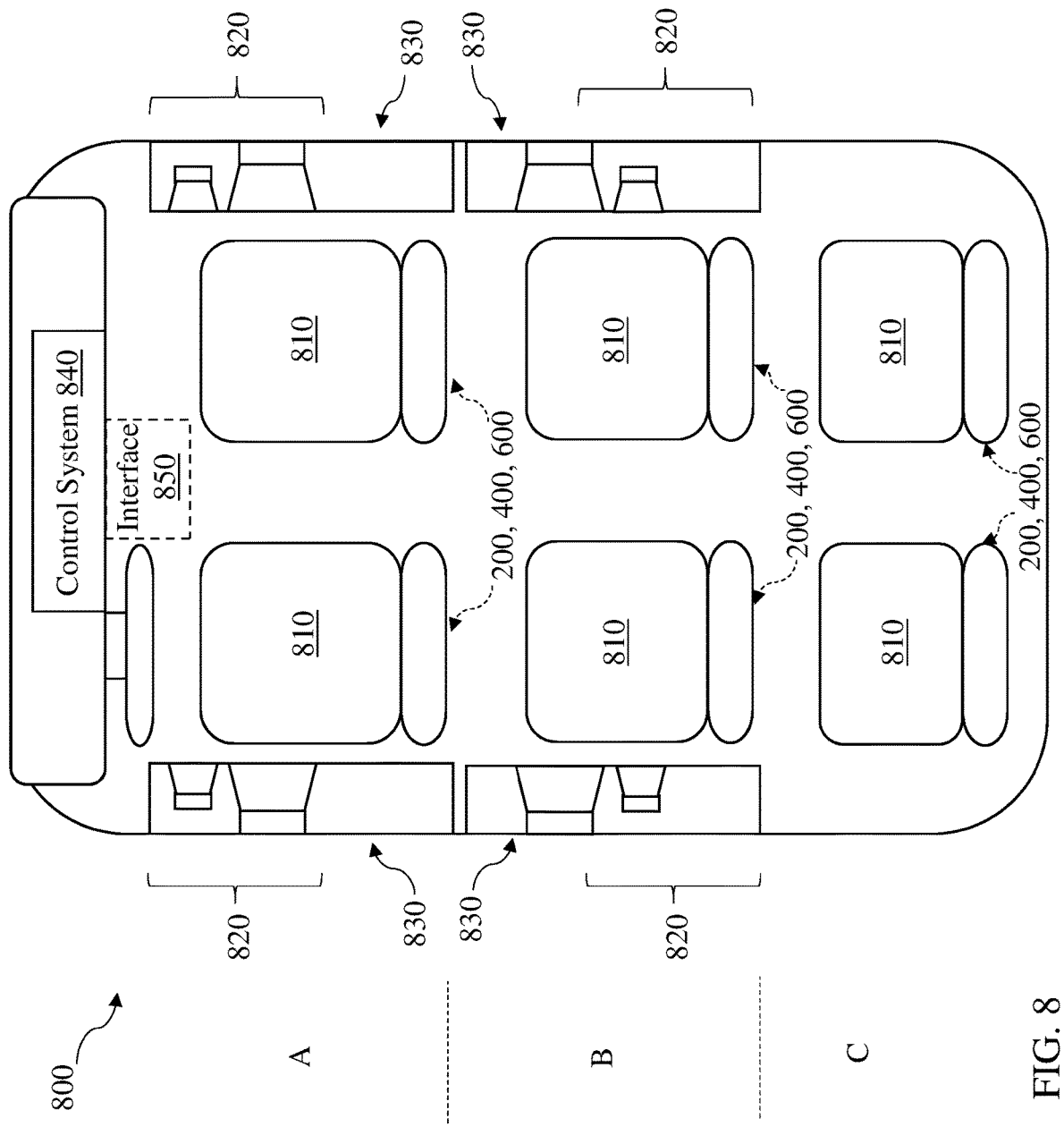
FIG. 8 is a schematic depiction of an audio system in an automobile according to various implementations.

FIG. 8 is a schematic depiction of a vehicle audio system 800 in a multi-row vehicle cabin, e.g., such as in a wagon, mini-van or sport utility vehicle (SUV). The cabin is shown having a plurality of rows (Rows A, B, C) of seats 810. Door-mounted transducers 820 (e.g., speakers) are shown along four doors 830 of the vehicle cabin. This is merely one illustration of a vehicle audio system 800 that can benefit from the headrests disclosed according to various implementations. In some cases, headrests disclosed according to various implementations are included in one or more rows A, B and/or C of the seats 810. For example, in some implementations, a headrest (e.g., headrest 200, 400 or 600) is coupled with the base of a seat 810 in the front row (row A), middle row (row B) or back row (row C). In some particular implementations, when a headrest (e.g., headrest 200, 400 or 600) is present in a row (e.g., row A), all of the seats 810 in that row have a substantially identical headrest. In these cases, both the driver's side seat and passenger's side seat in a given row have the same headrest configuration (e.g., headrest 200, 400 or 600). A conventional control system 840 and an interface 850 are shown for illustrative purposes. Additional audio system components and subcomponents (e.g., a head unit and an amplifier, as well as additional speakers), along with connections (e.g., wired connections) between components are omitted for clarity of illustration. It is understood that this configuration is only one example of an audio system used to illustrate various implementations of the disclosure, and that a variety of additional configurations can be utilized with these implementations.

In some particular implementations, the headrest according to various implementations (e.g., headrest 200, 400 or 600) is only located in the middle row (i.e., row B) or the back row (i.e., row C) of the seats. In these cases, one or more seats 810 in the row can include the headrest.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

We claim:

1. A vehicle headrest comprising:
a main body having a front surface arranged to support a back of a head of a user and a pair of acoustic channels each formed in part by a side wall having a front edge that is offset from the front surface, the main body comprising a portion configured to receive first and second transducers having a center-to-center spacing (Dimension A) of approximately 130 millimeters (mm) or greater,
wherein the pair of acoustic channels are arranged symmetrically about a centerline axis of the main body; and
a transducer mount in each of the pair of acoustic channels for mounting respective ones of the first and second transducers, wherein a dimension (Dimension C) is defined by a rotation angle of the transducer mount relative to a centerline of the vehicle headrest, wherein Dimension C is approximately −20 degrees to approximately zero degrees, such that when mounted to the respective transducer mounts, the first and second transducers are oriented at a forward firing angle or an inward firing angle relative to the centerline of the vehicle headrest.

2. The vehicle headrest of claim 1, wherein a dimension (Dimension F) is defined by an amount that the front edge of each side wall is recessed from the front surface and is equal to or less than approximately 35 mm.

3. The vehicle headrest of claim 1, wherein the main body comprises a material that is acoustically non-transparent.

4. The vehicle headrest of claim 1, wherein a width between exits of the pair of acoustic channels is defined by a dimension (Dimension E) that is approximately 180 mm to approximately 220 mm.

5. The vehicle headrest of claim 1, further comprising the first and second transducers located in a respective one of the pair of acoustic channels.

6. The vehicle headrest of claim 5, further comprising third and fourth transducers located in a respective one of the pair of acoustic channels and having a center-to-center spacing of approximately 130 mm to approximately 240 mm.

7. The vehicle headrest of claim 5, further comprising respective acoustic seals around each of the first and second transducers for impeding acoustic energy leakage from the first and second transducers into the main body.

8. The vehicle headrest of claim 5, wherein a dimension (Dimension D) is defined by a distance from the front surface of the main body to a midpoint of each of the transducers.

9. The vehicle headrest of claim 1, wherein a perpendicular line (Dimension J) drawn from a face of each of the respective first and second transducers is acoustically unobstructed by the respective acoustic channels.

10. An audio system for a vehicle, the audio system comprising:
a headrest coupled with a base of a seat in a vehicle, the headrest comprising:
a main body having a front surface arranged to support a back of a head of a user and a pair of acoustic channels each formed in part by a side wall having a front edge that is offset from the front surface,
wherein the main body comprises a material that is acoustically non-transparent;
a transducer mount in each of the pair of acoustic channels; and
a first transducer and a second transducer each housed within the main body of the headrest and each mounted to one of the transducer mounts,
wherein a dimension (Dimension C) is defined by a rotation angle of the transducer mount relative to a centerline of the vehicle headrest, wherein Dimension C is approximately −20 degrees to approximately zero degrees, such that the first and second transducers are oriented at a forward firing angle or an inward firing angle relative to the centerline of the vehicle headrest.

11. The audio system of claim 10, wherein the pair of acoustic channels are arranged symmetrically about a centerline axis of the main body.

12. The audio system of claim 10, wherein a dimension (Dimension F) is defined by an amount that the front edge of each side wall is recessed from the front surface and is equal to or less than approximately 35 mm.

13. The audio system of claim 10, wherein a width between exits of the pair of acoustic channels is defined by a dimension (Dimension E) that is approximately 180 mm to approximately 220 mm.

14. The audio system of claim 10, further comprising third and fourth transducers located in a respective one of the pair of acoustic channels and having a center-to-center spacing of approximately 130 mm to approximately 240 mm.

15. The audio system of claim 10, further comprising respective acoustic seals around each of the first and second transducers for impeding acoustic energy leakage from the first and second transducers into the main body.

16. The audio system of claim 10, wherein a dimension (Dimension D) is defined by a distance from the front surface of the main body to a midpoint of each of the transducers.

17. The audio system of claim 10, wherein a perpendicular line (Dimension J) drawn from a face of each of the respective first and second transducers is acoustically unobstructed by the respective acoustic channels.

18. A vehicle headrest comprising:
a main body having a front surface arranged to support a back of a head of a user and a pair of acoustic channels each formed in part by a side wall having a front edge that is offset from the front surface, the main body comprising a portion configured to receive first and second transducers having a center-to-center spacing (Dimension A) of approximately 130 millimeters (mm) or greater; and
a transducer mount in each of the pair of acoustic channels for mounting respective ones of the first and second transducers, wherein a dimension (Dimension C) is defined by a rotation angle of the transducer mount relative to a centerline of the vehicle headrest, wherein Dimension C is approximately −20 degrees to approximately zero degrees, such that when mounted to the respective transducer mounts, the first and second transducers are oriented at a forward firing angle or an inward firing angle relative to the centerline of the vehicle headrest,
wherein a width between exits of the pair of acoustic channels is defined by a dimension (Dimension E) that is at least approximately 180 mm.

19. The vehicle headrest of claim 18, wherein the main body comprises a material that is acoustically non-transparent, and wherein the pair of acoustic channels are arranged symmetrically about a centerline axis of the main body.

20. The vehicle headrest of claim 18, wherein a perpendicular line (Dimension J) drawn from a face of each of the respective first and second transducers is acoustically unobstructed by the respective acoustic channels.

* * * * *